US007345753B2

(12) United States Patent
Bhaskar et al.

(10) Patent No.: US 7,345,753 B2
(45) Date of Patent: Mar. 18, 2008

(54) APPARATUS AND METHODS FOR ANALYZING DEFECTS ON A SAMPLE

(75) Inventors: Kris Bhaskar, San Jose, CA (US); Ardis Liang, Fremont, CA (US); Michael J. Van Riet, Morgan Hill, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 431 days.

(21) Appl. No.: 11/069,343

(22) Filed: Feb. 28, 2005

(65) Prior Publication Data

US 2006/0102839 A1 May 18, 2006

Related U.S. Application Data

(60) Provisional application No. 60/619,020, filed on Oct. 15, 2004.

(51) Int. Cl.
*G01N 21/00* (2006.01)
(52) U.S. Cl. .............................. 356/237.5; 250/559.45
(58) Field of Classification Search ............. 356/237.5; 702/35, 83–84; 716/4; 700/110; 250/559.4–559.45, 250/397
See application file for complete search history.

(56) References Cited

U.S. PATENT DOCUMENTS

| 5,539,752 | A  | 7/1996  | Berezin et al.   |
|-----------|-----|---------|------------------|
| 5,598,341 | A  | 1/1997  | Ling et al.      |
| 5,699,447 | A  | 12/1997 | Alumot et al.    |
| 5,801,965 | A  | 9/1998  | Takagi et al.    |
| 5,991,699 | A  | 11/1999 | Kulkarni et al.  |
| 6,104,835 | A  | 8/2000  | Han              |
| 6,169,282 | B1 | 1/2001  | Maeda et al.     |
| 6,208,751 | B1 | 3/2001  | Almogy           |
| 6,259,520 | B1 | 7/2001  | Zeimantz         |
| 6,300,629 | B1 | 10/2001 | Lawrence         |
| 6,324,298 | B1 | 11/2001 | O'Dell et al.    |
| 6,393,602 | B1 | 5/2002  | Atchison et al.  |
| 6,407,386 | B1 | 6/2002  | Dotan et al.     |
| 6,408,219 | B2 | 6/2002  | Lamey et al.     |
| 6,424,881 | B1 | 7/2002  | Steffan et al.   |

(Continued)

OTHER PUBLICATIONS

US Office Action mailed Aug. 23, 2004, from US Patent No. 6,959,251.
US Office Action mailed Jan. 21, 2005, from US Patent No. 6,959,251.
Usami et al, Semiconductor Inspection System for Yield Enhancement, 1999, Hitachi review, vol. 48, No. 6, pp. 354-360.

(Continued)

*Primary Examiner*—Gregory J. Toatley, Jr.
*Assistant Examiner*—Tri Ton
(74) *Attorney, Agent, or Firm*—Beyer Weaver LLP

(57) ABSTRACT

Disclosed are methods and apparatus for facilitating procedures implemented on an analysis tool are provided herein. In one embodiment, an apparatus includes an analyzer module arranged for managing an analyzer tool and causing a high resolution image generated by the analyzer tool to be presented in a display. The apparatus also includes an inspector interface module arranged for simulating an inspector interface in the display. The inspector interface includes features that are available on a corresponding inspection tool, and the inspector interface is based at least in part on defect results from the inspection tool. In one embodiment, the analyzer module executes without knowledge of the inspector interface module and visa versa, and the apparatus includes a synchronization mechanism that knows about these two modules and also is capable of communicating with these two modules.

19 Claims, 11 Drawing Sheets

U.S. PATENT DOCUMENTS

| | | |
|---|---|---|
| 6,426,501 B1 | 7/2002 | Nakagawa |
| 6,438,438 B1 | 8/2002 | Takagi et al. |
| 6,477,685 B1 | 11/2002 | Lovelace |
| 6,507,933 B1 | 1/2003 | Kirsch et al. |
| 6,521,466 B1 | 2/2003 | Castrucci |
| 6,542,830 B1 | 4/2003 | Mizuno et al. |
| 6,583,414 B2 | 6/2003 | Nozoe et al. |
| 6,610,980 B2 | 8/2003 | Veneklasen et al. |
| 6,635,872 B2 | 10/2003 | Davidson |
| 6,674,890 B2 | 1/2004 | Maeda et al. |
| 6,701,259 B2 | 3/2004 | Dor et al. |
| 6,744,266 B2 | 6/2004 | Dor et al. |
| 6,757,621 B2 | 6/2004 | Mizuno et al. |
| 6,826,735 B2 | 11/2004 | Ono et al. |
| 6,952,653 B2 | 10/2005 | Toth et al. |
| 6,959,251 B2 | 10/2005 | Coldren et al. |

OTHER PUBLICATIONS

US Office Action mailed Nov. 3, 2004, from US Patent No. 6,952,653.

Yoda et al., "An Automatic Wafer Inspection System Using Pipelined Image Processing", Jan. 1988, IEEE Transactions on Pattern Analysis and Machine Intelligence, vol. 10, No. 1.

Ben-Porath et al., Advanced Process Development and Control Based on a Fully Automated SEM with ADC, 1999, IEEE/SEMI Advanced Semiconductor Manufacturing Conference, pp. 275-280.

Rehani et al., "An Automated Recipe-Based Defect Analysis System for ASICs", SEMICON 1999, Yield Management Solutions, pp. 40-43.

Fan et al., "Effective Defect Detection and Classification Methodology Based on Integrated Laser Scanning Inspection and Automatic Defect Classification", 1998, IEEE/SEMI Advanced Semiconductor Manufacturing Conference, pp. 266-271.

APPARATUS AND METHODS FOR ANALYZING DEFECTS ON A SAMPLE

CROSS REFERENCE TO RELATED PATENT APPLICATION

This application claims priority of U.S. Provisional Patent Application No. 60/619,020, entitled "APPARATUS AND METHODS FOR ANALYZING DEFECTS ON A SAMPLE", filed 15 Oct. 2004 by Kris Bhaskar, et al., which application is incorporated herein by reference in its entirety for all purposes.

BACKGROUND OF THE INVENTION

The present invention relates generally to semiconductor inspection and defect analysis techniques, and more specifically to techniques for reviewing (or analyzing) defects on the defect analysis apparatus.

Generally, the industry of semiconductor manufacturing involves highly complex techniques for fabricating integrating circuits using semiconductor materials. Due to the large scale of circuit integration and the decreasing size of semiconductor devices, the semiconductor manufacturing process is prone to processing defects. Testing procedures are therefore critical to maintain quality control. Since the testing procedures are an integral and significant part of the manufacturing process, the semiconductor industry is constantly seeking more accurate and efficient testing procedures.

An optical inspection tool is commonly used to detect defects. Typical inspection processes detect defects by comparing similar semiconductor device areas on a wafer (e.g., die-to-die or cell-to-cell). The differences detected between the two device areas can either be a defect, which can cause a device to function improperly, or a nuisance, which will not affect system operations. An integral phase of semiconductor wafer inspection involves optimizing the settings, commonly referred to as the "recipe," of an inspection device so that it can accurately distinguish defects from nuisances.

After potential defects are found by an inspection system, the wafer is typically transferred to a review tool or a metrology tool. In general, the review tool and metrology tool have a significantly higher resolution than the inspection tool. This higher resolution is needed to analyze or measure rather small defects. A scanning electron microscopy (SEM) system is typically used as a review tool to provide high resolution images of defects for examination.

When the wafer is transferred to a review tool (or metrology tool), a defect file is also usually sent to the review tool. The inspection defect file typically includes the coordinates of each defect so that the review tool can automatically move to each of the locations on the wafer and image each defect (or nuisance) found at each location. An operator then reviews a sampling of the defects and classifies such defects. The operator then uses the classification information to determine whether the inspection tool is set up correctly or can be improved, e.g., so that important defects are substantially captured while a minimum number of nuisance errors are captured. If it is determined that the inspection tool is not set up correctly or can be improved, then an operator manually walks from the review station to the inspection station to then adjust the recipe of the inspection tool. The wafer is also transferred back to the inspection tool and defect data is once again collected under the new recipe settings. This procedure may be repeated any number of times until the operator at the review station determines that the inspection tool is set up correctly. Thus, setting up the inspection tool can be a rather tedious and time consuming procedure, which requires an operator to walk back and forth between the inspection station and the review station.

Additionally, the defect information from the inspection tool that is typically available at the review tool is very limited. It only provides the review tool with a mechanism for stepping to each defect location and little else. The defect information does not include any other contextual information, such as the inspection defect patches, which may aid defect analysis procedures at the review tool.

In view of the foregoing, it would be desirable to have a richer amount of defect information from the inspection tool available at the review tool so as to facilitate procedures implemented at the defect review tool. Additionally, improved apparatus and techniques for efficiently setting up the inspection tool are needed.

SUMMARY OF THE INVENTION

Accordingly, mechanisms for facilitating procedures implemented on an analysis tool (e.g., review or metrology tool) are provided herein. In general, these mechanisms allow one to review the results from a inspection tool, or the like, using the user interface and features of the inspection tool, or the like, while the sample (e.g., wafer) is loaded and imaged instead on the analysis tool. In one embodiment, an inspection user interface is simulated on the analysis tool. A rich set of defect data that was collected from the inspection tool is presented in this inspection user interface. One or more defect images imaged by the analysis tool may also be displayed in this or a different interface of the analysis tool. The simulated inspection user interface may be manipulated in conjunction with reviewing of the high resolution image from the analysis tool to facilitate defect analysis or metrology.

In a specific application, as defects are reviewed on the analysis tool, settings of the inspection tool may be simulated via the inspection user interface to determine whether adjustments to the inspection tool recipe will result in an optimum level of defects and nuisances from the inspection tool. The simulation results (e.g., simulated defect results from the inspection tool) are presented within the inspection user interface at the analysis tool. Other inspection interface features facilitate defect classification or nuisance filtering.

In one embodiment, an apparatus for analyzing defects is disclosed. This apparatus includes an analysis tool arranged for imaging a defect and generating a high resolution image and at least one display device arranged for presenting the high resolution image generated by the analysis tool. The apparatus further includes an analyzer module arranged for managing the analyzer tool and causing the high resolution image generated by the analyzer tool to be presented in the at least one display. The apparatus also includes an inspector interface module arranged for simulating an inspector interface in the at least one display device, wherein the inspector interface includes features that are available on a corresponding inspection tool, and wherein the inspector interface is based at least in part on defect results from the inspection tool. In one embodiment, the analyzer module executes without knowledge of the inspector interface module and visa versa, and the apparatus includes a synchronization mechanism that knows about these two modules and also is capable of communicating with these two modules. In one aspect, the synchronization module is formed from an analyzer script module configured for communicating with the analyzer module and an inspector script configured for communicating with the inspector interface module, where the analyzer and inspector scripts are further configured to communicate with each other.

In a further aspect, the defect results include a plurality of defect identifiers, and a plurality of defect locations, a plurality of defect patch images from the corresponding inspection tool, and defect difference intensity values. In a specific implementation, the analyzer tool is in the form of a scanning electron metrology (SEM) review tool. In another aspect, the features of the simulated inspector interface are configured to be used to facilitate defect analysis procedures performed at the analyzer tool. In yet another embodiment, the features in the inspector interface that are configurable to provide useful defect information is viewable and interactive as one reviews high resolution images produced by the analyzer tool. In a further implementation, the features are in the form of selection mechanisms for automatically affecting which images are generated and/or grabbed by the analysis tool.

These and other features of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION OF THE PREFERRED EMBODIMENTS

Figure 1:
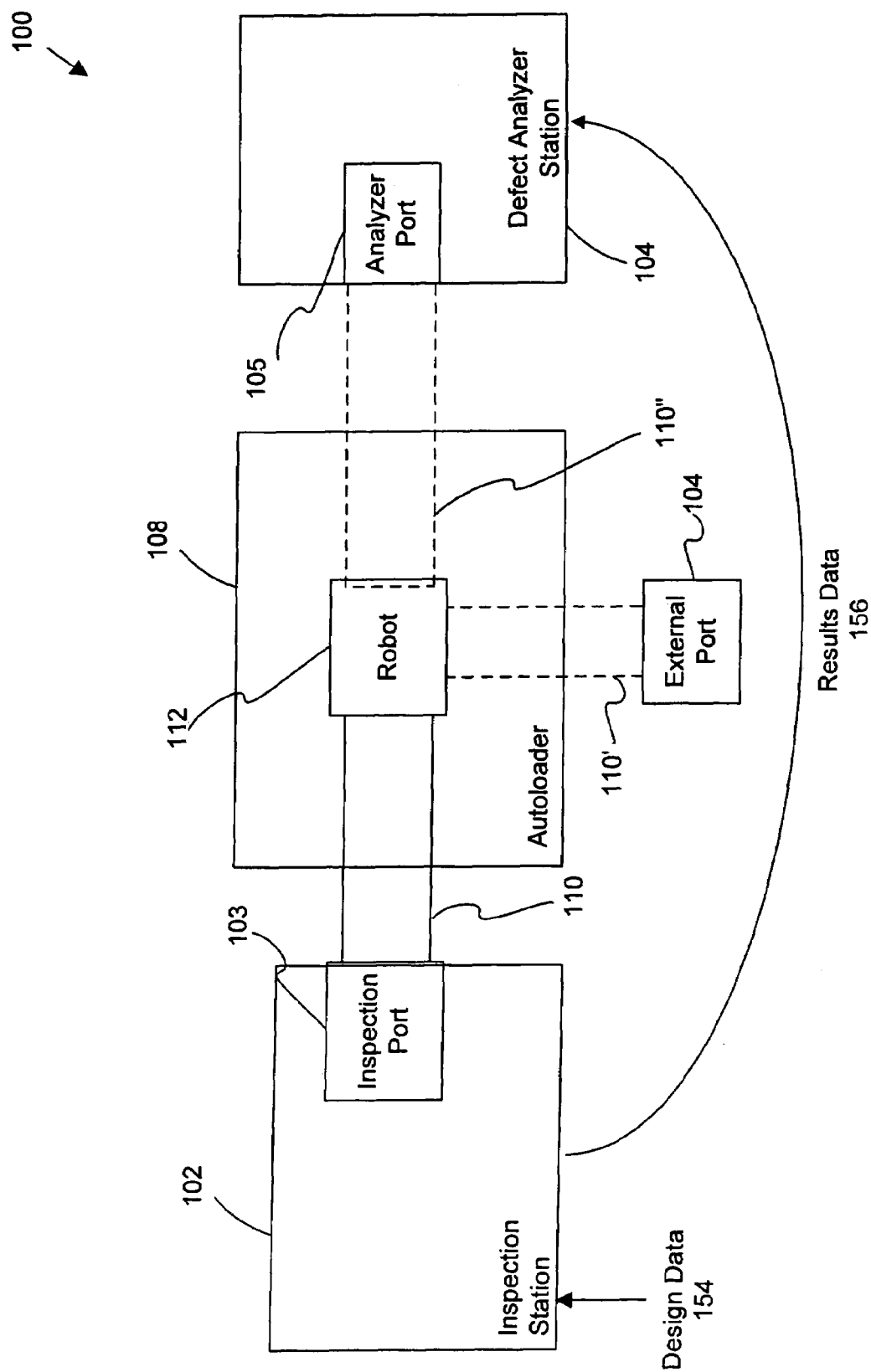
FIG. 1 is a diagrammatic representation of system that includes an inspection station for inspecting a sample for defects and an analyzer station for analyzing such defects in which embodiments of the present invention may be implemented.

Reference will now be made in detail to the specific embodiments of the invention. Examples of these specific embodiments are illustrated in the accompanying drawings. While the invention will be described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general, an analyzer system that includes inspector tool interface features and an analyzer tool for generating high resolution images is described herein. These inspection interface features may be used to aid analysis of high resolution images produced at the analyzer station. Accordingly, the analyzer system includes any suitable scanning or metrology component for producing high resolution images. For example, the analyzer system includes an SEM defect review or CD SEM metrology tool.

In specific embodiments of the present invention, the analyzer system also includes an inspector interface for receiving and presenting the native defect results generated by an inspection tool or the like and providing useful inspector tool interface features at the analyzer tool. That is, an inspector interface which includes several novel features for facilitating defect analysis at the analyzer system, is provided at the analyzer system. The inspector interface may include any number and combination of the inspector interface features described below. Some features in the inspector interface provide useful defect information that can be viewed and/or manipulated as one reviews high resolution images produced by the analyzer tool. Other features are in the form of selection mechanisms for automatically affecting which images are generated and/or grabbed by the analysis tool. One useful feature causes the native results to be presented so that an operator or an automatic process may try out different inspection recipe settings at the analyzer system and see the results of such modification on the inspection results presented in the inspector interface of the analyzer system. The native results may include defect identifiers, defect locations, defect patch images, defect difference intensity values, etc., as described further below.

Several possible solutions may be implemented to provide inspector interface features at the analyzer tool. In one embodiment, the inspection tool software is merged with the analyzer software on analzyer tool. Although this solution would provide seamless integration of inspection features on the analysis tool, this method presents several difficulties, such as time delays in coordinating software updates. The inspection tool software is typically updated first and the analyzer tool's inspection software then takes several months to update and integrate with the analyzer tool. This update process would likely entail a significant delay in integrating the inspection software updates on the analyzer tool. Since the analyzer tool requires different software changes than the inspection tool due to their different architectures, the inspector software update process on the analyzer tool would necessarily be complex and time consuming. It may be possible to use Plug & Play inspection features to more efficiently allow software updates. Unfortunately, converting the inspection tool software features into Plug & Play software modules would also be a time consuming and complex task. Another similar solution is to provide a mechanism for allowing the native inspection results to be communicated to the analyzer tool (or review tool). In other words, the inspection and review software are configured to communicate with each other. Several embodiments of an integrated system are described further in co-pending U.S. application, having application Ser. No. 10/298,389, entitled "INSPECTION SYSTEM SETUP TECHNIQUES", filed 14 Nov. 2002, by David Bruce Coldren et al., which application is incorporated herein by reference in its entirety for all purposes.

In the illustrated embodiment, a simulated inspector user interface is provided on the analysis tool. The inspection native results are used to generate this inspector user interface at the analyzer system. These native results include more information than the file (e.g., KLARF file for KLA-Tencor inspection systems) that is typically passed from the inspection tool to the review tool, for example. In one implementation, the inspection results includes patch images, polarity information, defect identities and coordinates, rough defect sizing information, difference intensity values resulting from the inspection comparisons, specific recipe parameter(s) responsible for detecting the defect, optical images captured on the inspection system, natural groups or automated classification results determined by the inspector, etc. A number of these native results parameters are advantageously presented in the inspector user interface in ways that facilitate defect analysis as described further below.

Patches are images that were generated from an inspection process and they give a context for the identified defects. In one implementation, the patches include an image of the defect and its surrounding area, an image of the corresponding reference area, and an image of the defect by itself. One may use the patches during the analysis process to provide more information for determining a defects class, for example, as well as for other analysis purposes. The patches may also allow easier location of the defect at the analysis tool. Polarity information specifies whether the defect is a bright or dark defect. Polarity may be important when determining what kind of a nuisance filter use, e.g., the polarity may be used to filter either particular classes of bright or dark defects. Both patches and polarity may be presented in the simulated inspector interface on embodiments of an inventive analyzer system.

In this implementation, comprehensive native results information is advantageously made available in a simulated inspection user interface. In contrast, the analysis tool user interface only shows a part of this native results data, such as location of defects in the form of a defect map and defect table, as well as rough sizing, along with high resolution images. In embodiments of the present invention, these high resolution images can be viewed in conjunction with a fuller set of results information that is displayed in the inspection user interface, and, thus, one can more fully analyze the defects (e.g., classify and/or measure) and also determine when and how to adjust the inspection tool better.

In sum, an analyzer system is provided which allows one to access and manipulate the inspection native results while sitting at the analyzer tool, e.g., SEM tool. In the illustrated embodiment, this analyzer system includes an inspector user interface which allows one to analyze and manipulate the native results of the inspection while viewing and analyzing high definition analyzer images.

FIG. 1 is a diagrammatic representation of system 100 that includes an inspection station 102 for inspecting a sample for defects and an analyzer station 104 for analyzing such defects in which embodiments of the present invention may be implemented. The sample may be anything that requires an inspection for defects, such as a semiconductor wafer or reticle. As shown, the system 100 provides at least one inspection station 102 for inspecting a sample for potential defects and at least one analysis station 104 for analyzing the potential defects. The system 100 may include more than one inspection station for inspecting different types of defects, as well as more than one analysis station for reviewing or analyzing different types of defects, for example.

The system 100 also includes a mechanism for transporting samples between the inspection station 102 and the analysis station 104. In the illustrated embodiment, the system 100 includes an autoloader 108 for automatically transporting samples. The autoloader 108 includes a robot 112 having an arm that can extend to a position 110 towards an inspection port 103 of the inspection station 102. The arm may also rotate and extend to a position 110' towards an external port 104, where it is in a state denoted by reference number 110'. Similarly, when in its state denoted by reference number 110", the robotic arm can also extend towards an analyzer station port 105 of a analysis station 104 for analyzing potential defects found by the inspection station 102. The robotic arm is designed to further extend and retrieve a sample from analysis station 104. Alternatively, a robot having one or more arms may move between stations on a track. Any suitable automation mechanism may be utilized, and such automation mechanisms are well known to those skilled in the art.

A defect analysis process, according to one embodiment of the present invention, may begin after a plurality of samples are placed on external port 104, with the intention of storing the samples until one is used in a subsequent inspection application, for example. Robotic arm in its position 110' transports a sample from external port 104 and places it in the inspection port 103 of inspection station 102. After a sample is inspected by inspection station 102, robotic arm 110 retrieves the inspected sample from the inspection port 103 and places it on analyzer port 105 of analysis station 104 by extending the robotic arm to position 110". After a sample is reviewed or analyzed, the robotic arm may then retrieve the analyzed sample from analyzer port 105 and place it back into the external port 104 by moving from position 110" to position 110'.

The inspection station 102 may also include one or more computer system(s) (not shown) for implementing a process in which it is determined whether the sample has passed inspection. Alternatively, the computer system may be separate from the inspection station 102. The inspection station 102 may receive design data 154 in the form of a list of geometrical figures, for example. Additionally, the inspection station 102 obtains image data from the sample. The inspection station 102 then analyzes the image data by comparing it to a baseline image, which may be generated from the design data 254 or more typically, from a similar area of the sample or a different sample (e.g., in a die-to-die or cell-to-cell mode inspection).

After the inspection has concluded, the robot 112 moves the sample to the analysis station 104. The inspection station 102 may also send defect results 156 (e.g., a native results file) to the analysis station 104 through a network (or the analyzer station 104 may retrieve the results 156 from the inspector station 102). The analysis station 104 may also include one or more computer system(s) (not shown) for implementing a defect analysis process where the potential defects are measured and/or reviewed and classified. Alternatively, a computer system may be separate from the inspection station 104.

Suitable computer systems for use in implementing and controlling the inspection and defect analysis techniques described herein may be obtained from various vendors (e.g., Dell Computer Corporation of Round Rock, Tex.) or custom built by an inspection system vendor, such as KLA-Tencor of San Jose, Calif.

Preferably, the inspection station 102 is in the form of an optical, UV (ultra-violet), electron beam, or other inspection system that is integrated with a computer system which implements many of the inspection operations described herein. Such composite system preferably includes at least (a) a baseline image (preferably compacted) stored in memory or a mechanism for obtaining the baseline image, (b) an imaging system arranged to generate an optical or electron beam image of the sample (and the baseline image), and (c) a processing unit configured to compare the baseline and current test images and thereby identify defects, as well as compute and store various statistical information. At a minimum, the imaging system will usually include (i) a source of illumination oriented to direct radiation onto a specified location of the sample; and (ii) one or more detectors oriented to detect an image of the sample from the source which has been scattered by the sample. The imaging system may also include a scanning means. Suitable inspection stations include the AIT-XP, eS20XP, TeraStar, and SL3UV available from KLA-Tencor, Corp. of San Jose, Calif.

The analysis station 104 also preferably forms a composite system to implement the analysis operations described further below. However, the analysis station 104 typically provides a higher resolution image of the sample for analysis of defects than the images provided by the inspection station 102. Suitable analysis stations include the eV300 and CRS3100 available from KLA-Tencor, Corp. of San Jose, Calif., and the novel analysis mechanisms described herein may be implemented within any of these systems.

Although the inspection station 102 and analysis station 104 are shown as separate tools, a single integrated inspection and analysis station may be utilized. Several embodiments of such an integrated system are further described in U.S. application Ser. No. 10/638,027, filed 8 Aug. 2003, entitled "METHODOLOGIES FOR EFFICIENT INSPECTION OF TEST STRUCTURES USING ELECTRON BEAM SCANNING AND STEP AND REPEAT SYSTEMS", by Gaurav Verma et al., which application is incorporated herein by reference in its entirety for all purposes.

In general, the inspection and analysis stations may include any suitable scanning (or step-and-repeat) module for inspecting a sample for defects or reviewing such defects. Each scanning module may take the form of an optical system, such as a bright field or dark field optical system. The scanning module may also utilize both bright field and dark field modes. Examples of bright field systems include the 2350, 2351, 2360, and 2370 from KLA-Tencor, Corp. of San Jose, Calif. Examples of dark field system include the AIT II, AIT XP, Fusion, Fusion UV, and SP1 PatternPro available from KLA-Tencor, Corp. of San Jose, Calif. Each scanning module may also take the form of an electron beam (ebeam) system, such as a scanning, snapshot, or step-and-repeat type ebeam system. A scanning module may be designed to detect special types of defects, such as macro defects across a large area of the sample, defects on a bare substrate, or defects within solder bumps (e.g., ball grid array bumps). Each scanning module or station may also be stand alone or integrated within a processing tool.

Figure 2:
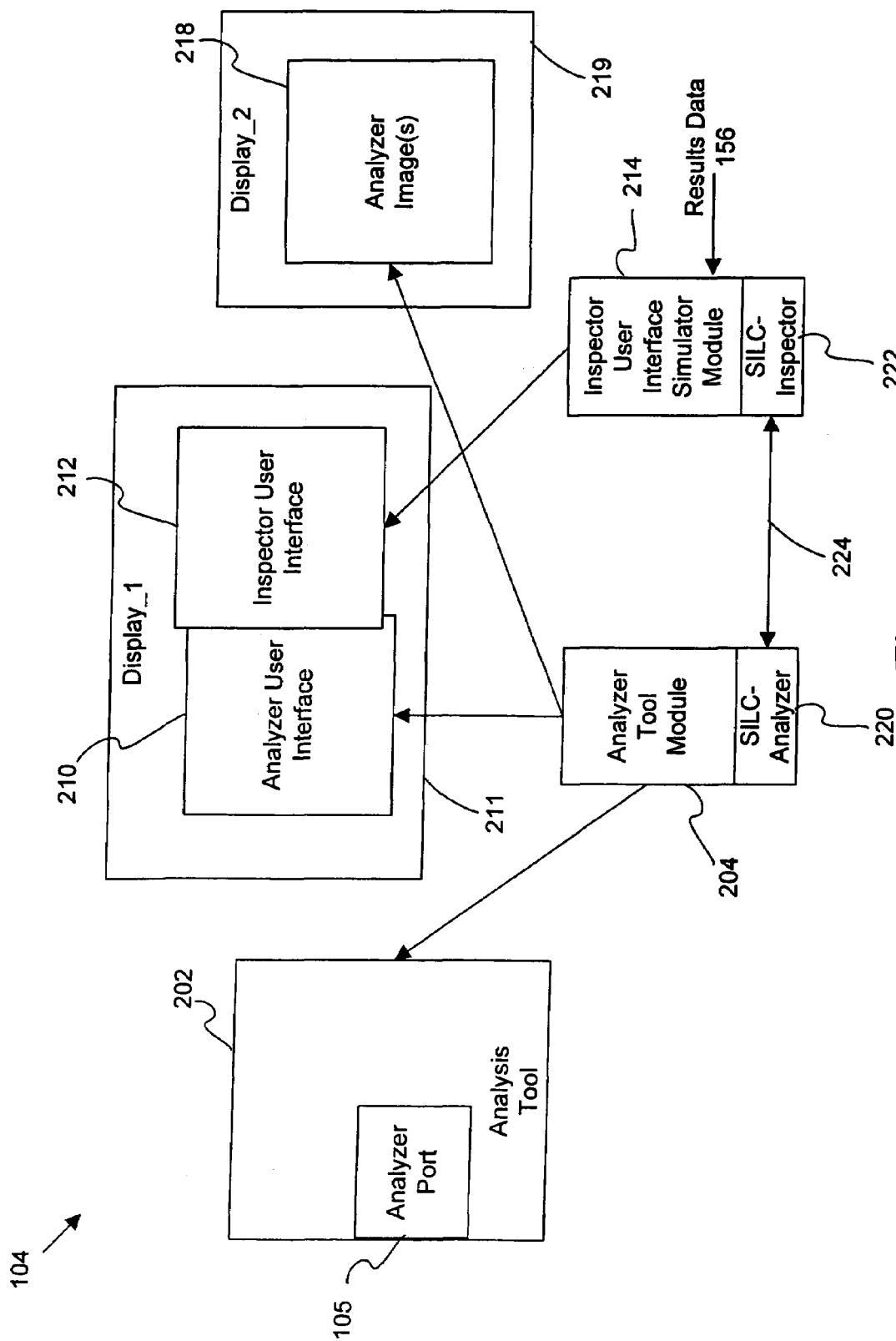
FIG. 2 is a diagrammatic illustration of the analysis system of FIG. 1 in accordance with one embodiment of the present invention.

FIG. 2 is a diagrammatic illustration of the analysis system 104 of FIG. 1 in accordance with one embodiment of the present invention. As shown, the analysis system 104 includes two monitors 211 and 219 although any number of monitors may be utilized. A first monitor or display device 211 is used to display a simulated inspector user interface 212 and an analyzer interface 210. Although the interfaces may have any suitable arrangement, in this example, the inspector user interface 212 is arranged atop the analyzer user interface 211 since the inspector user interface 212 will likely be used more often than the analyzer interface 211 during the analysis process. The other monitor 219 is used to display the analysis (e.g., SEM) images that are generated by the analyzer tool 202. Of course, a single monitor (or any number of monitors) may also be used to display the inspector user interface, analyzer user interface, and analyzer images. Additionally, the analyzer user interface may be eliminated altogether.

The analyzer system 104 may also include an analyzer tool module 204 for communicating with and controlling the analyzer tool 202 and also presenting defect information in the analyzer user interface 210. In one implementation, the analyzer tool module 204 is implemented in a single computer system. In specific examples, the analyzer tool module 204 specifies to the analyzer tool 202 when and where to move the stage and sample thereon. Additionally, there may be a separate computer system on which an inspector user interface simulator 214 is implemented. The inspector user interface simulator is configured to generate and control the inspector user interface 218 based on the defect results 156 as well as user interactions with the interface.

The inspector user interface 218 provides inspection interactive features at the analysis station 104 that would normally be presented at the inspection station. Some of these features allow manipulation of how the defect results are presented in the inspector user interface while other features allow control of the analysis tool via the inspector user interface.

In this embodiment, the analyzer module 204 executes without knowledge of the inspector module 214 and visa versa, and the analysis system 104 includes a synchronization mechanism that knows about these two modules and also is capable of communicating with these two modules. In general, this synchronization mechanism translates commands that are input into the inspector user interface simulator into commands that are input into the analyzer module 204 and visa versa. In the illustrated example, the synchronization mechanism takes the form of two scripts that are configured to loosely couple the analyzer and inspector modules. As shown, each module is associated with a SILC (SEM Inspector Loose Coupling) module 220 and 222. The analyzer module 204 is associated with SILC-Analyzer 220, while the inspector simulator module 214 is associated with SILC-Inspector 222. This arrangement allows the analyzer and inspector modules to communicate with each other without modifying either module.

Figure 3:
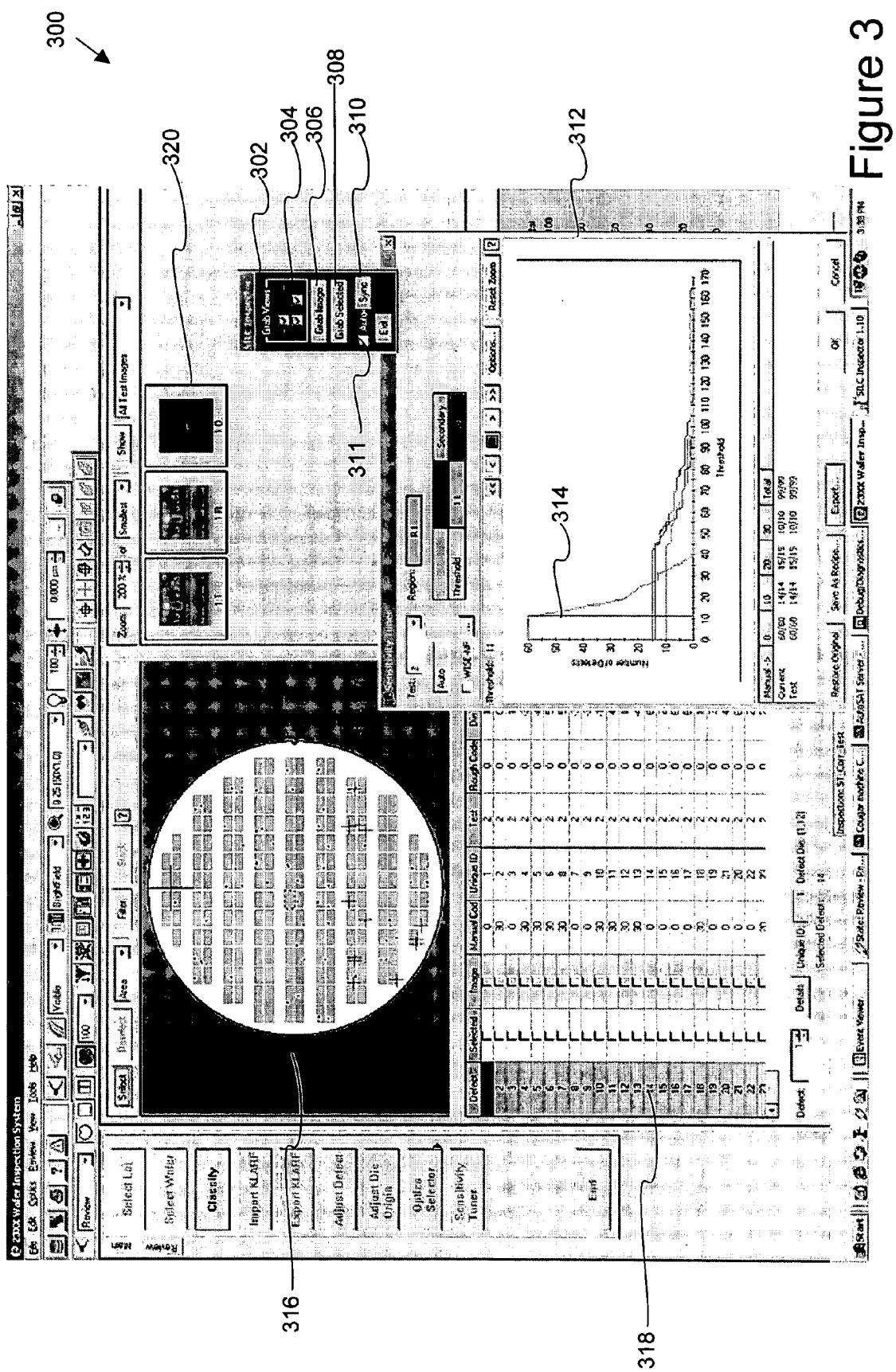
FIG. 3 is a screenshot of an example simulated inspector user interface in accordance with one embodiment of the present invention.
Figure 4:
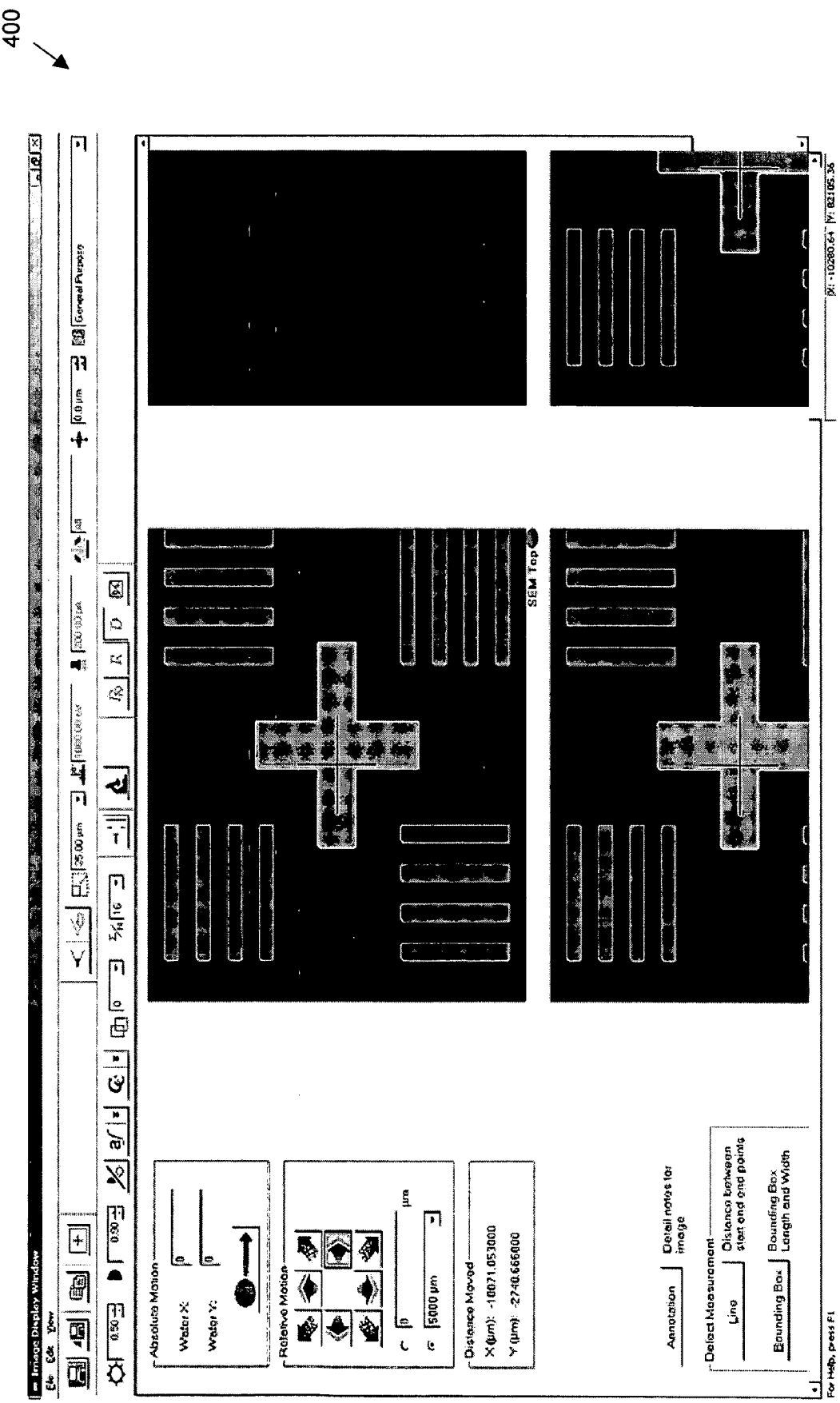
FIG. 4 is a screenshot of high resolution images displayed in a high resolution image window.

FIG. 3 is a screenshot of an example simulated inspector user interface 300 in accordance with one embodiment of the present invention. In this implementation, the inspector user interface presents the defect results in a number of ways. As shown, the interface 300 includes a defect wafer map 316 for showing the relative locations of the potential defects on a wafer having a plurality of dies. The interface also includes a defect list 318 for listing the defects, defect identities, absolute locations, etc. The interface 300 may also present the patches 320 corresponding to a selected defect. The interface 300 may include any number of patches or contextual images for each selected defect. As shown from left to right, the patches include a defect patch showing the defect and its surrounding area, a corresponding reference or baseline patch (without the defect), and the defect itself. The patches can provide additional information for analyzing the defects, such as contextual information. However, high resolution images are still required. A high resolution image is generally defined as an image having features that are resolved at less than ¼ of a micron. Of course, high resolution images will likely be defined differently in the future. Thus, high resolution images are displayed in a high resolution image window, such as the analyzer window 400 that is illustrated in FIG. 4.

Figure 5:
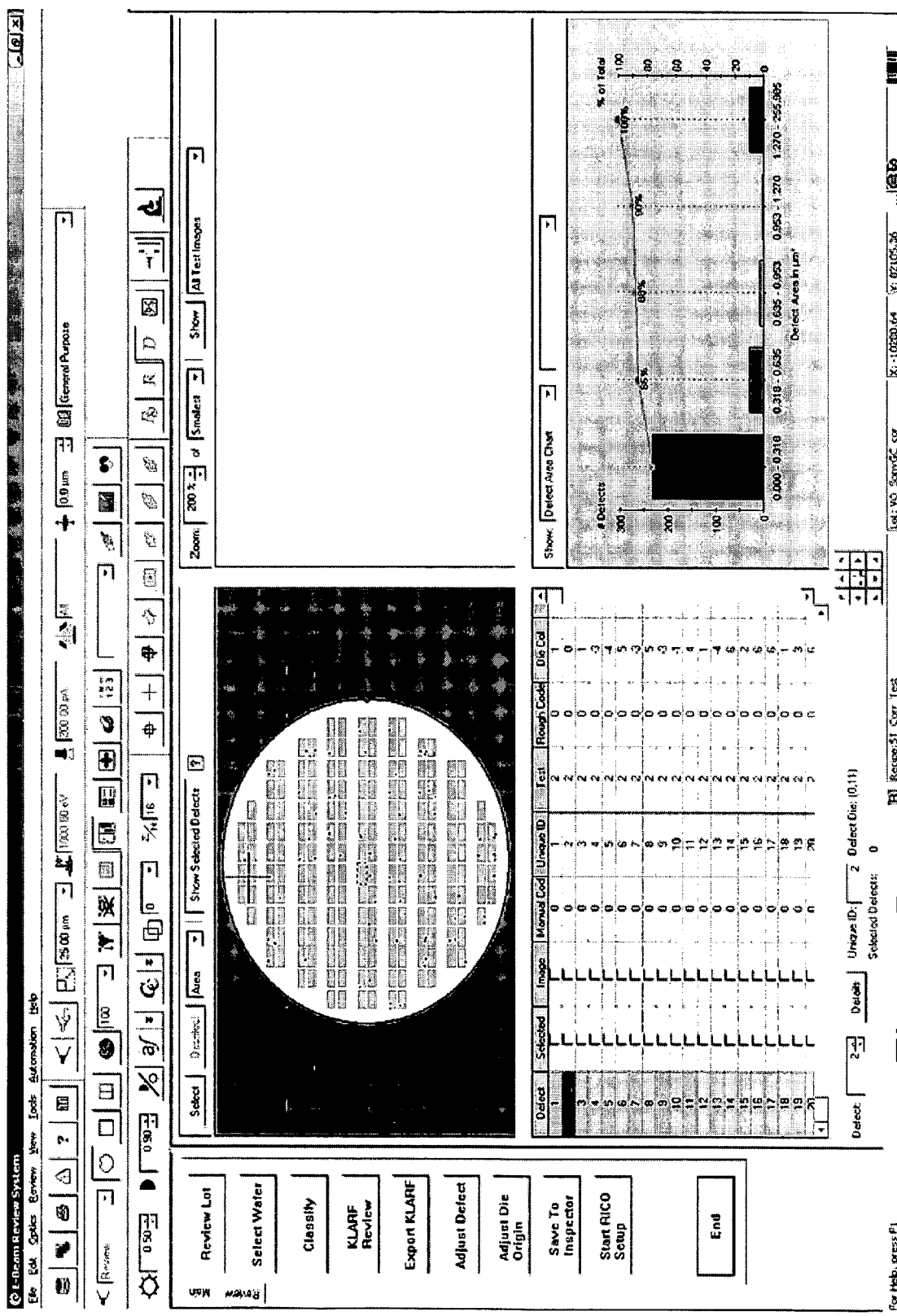
FIG. 5 is a screenshot of an analyzer tool user interface.

The analyzer system may also include an analyzer tool interface, an example of which is shown in FIG. 5. As shown, the analyzer tool user interface 500 includes similar features as shown in the inspector user interface of FIG. 3, such as a defect wafer map, defect table, and defect count graph. Although the analyzer interface includes a number of features for displaying the defect results, it does not have as many features as the inspector interface of FIG. 3.

Referring back to FIG. 3, the inspector user interface 300 may also include a visual optimizer 312 that allows one to adjust an inspection threshold 314 visually and immediately see the resulting changes in defect results. Of course, any number of thresholds may be adjusted. The optimizer 312, in one implementation, is a graph of the number of defects as a function of threshold and may include more than one threshold and corresponding defect count graphs.

Figure 6:
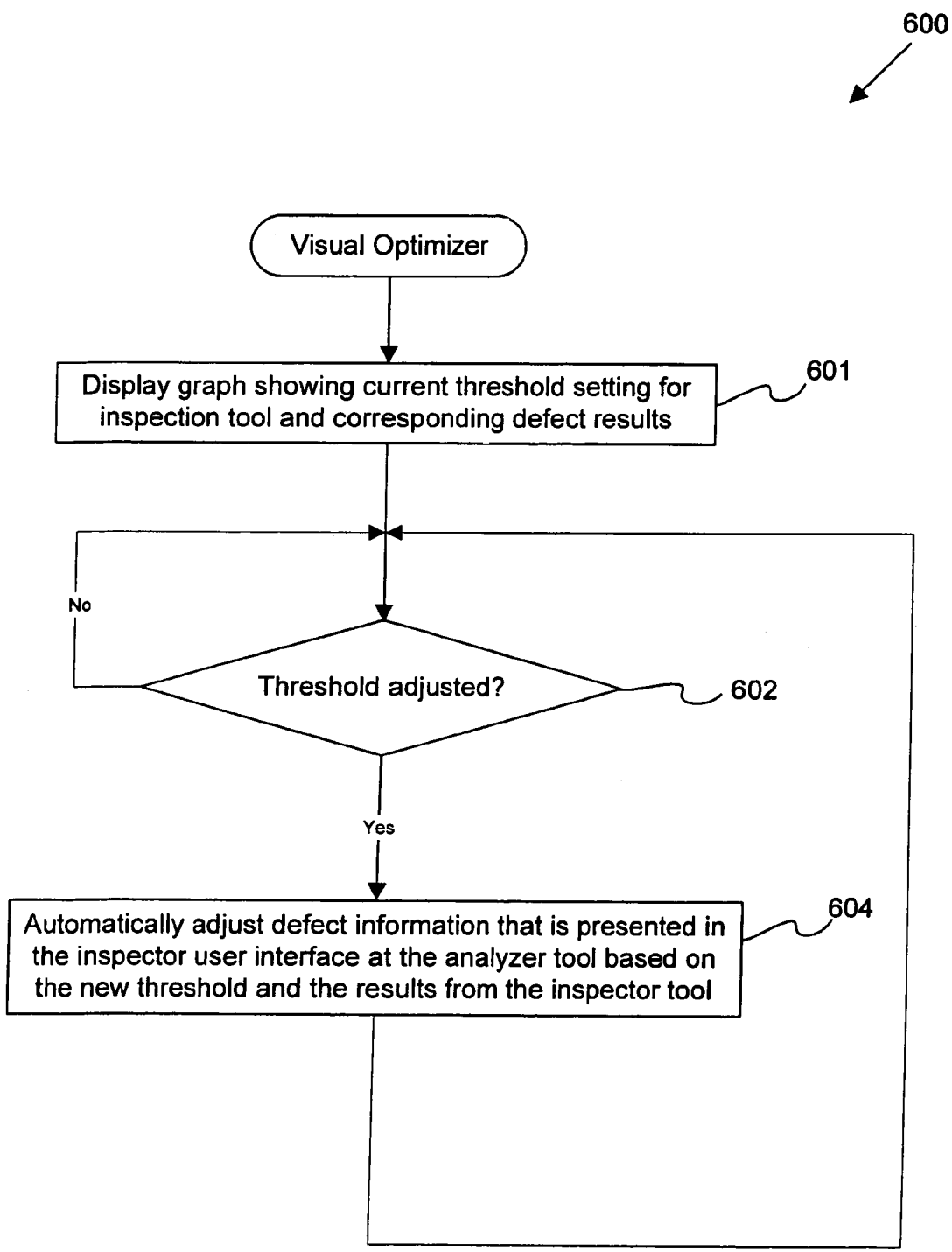
FIG. 6 is a flowchart illustrating a procedure for adjusting the threshold and viewing the results of such adjustment of the defect results at the analysis station in accordance with one embodiment of the present invention.

FIG. 6 is a flowchart illustrating a procedure 600 for adjusting an inspection threshold and viewing the results of such adjustment of the defect results at the analyzer system in accordance with one embodiment of the present invention. As an initial operation, the optimizer graph (e.g., such as the optimizer 312 of FIG. 3) is presented within the inspector user interface at the analyzer system (e.g., via the SILC-inspector 222 of FIG. 2) in operation 601. In one implementation, the defect results and current threshold used to generate such results are presented within an optimizer graph, such as the graph 312 illustrated in FIG. 3. It is then determined whether one or more thresholds have been adjusted in operation 602. For instance, it may be determined whether someone has adjusted the threshold line in the optimizer graph 312 of FIG. 3.

When one or more thresholds are adjusted, the defect information presented in the inspector user interface at the analyzer tool is automatically updated based on the new threshold and the results from the inspector tool in operation 304. For instance, the wafer map 316 and defect table 318 of FIG. 3 will be automatically updated when adjusting the threshold on the optimizer 312 of FIG. 3. This process 600 may be repeated by an operator as many times as needed to obtain an optimum threshold. For instance, the operator may continue to adjust the threshold until a substantial portion of the important defects are captured while the number of nuisance defects captured is minimized. This adjustment process may be repeated as many times as needed while the operator remains at the analyzer system.

Conventionally, an operator would have to determine at the analysis tool that the inspection tool's threshold has to be changed based on number of captures defects of a particular class such as nuisances. The operator then goes to the inspection tool to change the threshold and run the scan again to display the results in the inspector user interface. In the present invention, while an operator is at the analysis tool, the threshold can be adjusted in the inspection tool user interface and defect results data is then updated in the user interface without running a new scan of the wafer. That is, one can optimize the inspection recipe while remaining at the analyzer tool, e.g., SEM review tool.

In one implementation, intensity values are captured and stored in the native results during the inspection (e.g., if set up to do so on the inspection tool). For example, when two different die areas are compared, an intensity difference between the two areas is captured, along with whether that difference translates into a defect because it is above a selected threshold. Since the native results are made available to the inspector user interface on the analysis tool, one or more threshold(s) for the inspection may be adjusted and it is then immediately known via the collected native results how many defects are present after such change. That is, it is known how many intensity differences in the native results are now less than or equal to the new threshold. The defect counts for each defect class can then be updated accordingly. High resolution analysis images (e.g., SEM images) may also be viewed during this adjustment process.

The threshold optimizer feature is used after a number of defects have been classified. Accordingly, the inspector user interface may also include any number of features for aiding the defect classification process, as well as other defect analysis processes.

Figure 7:
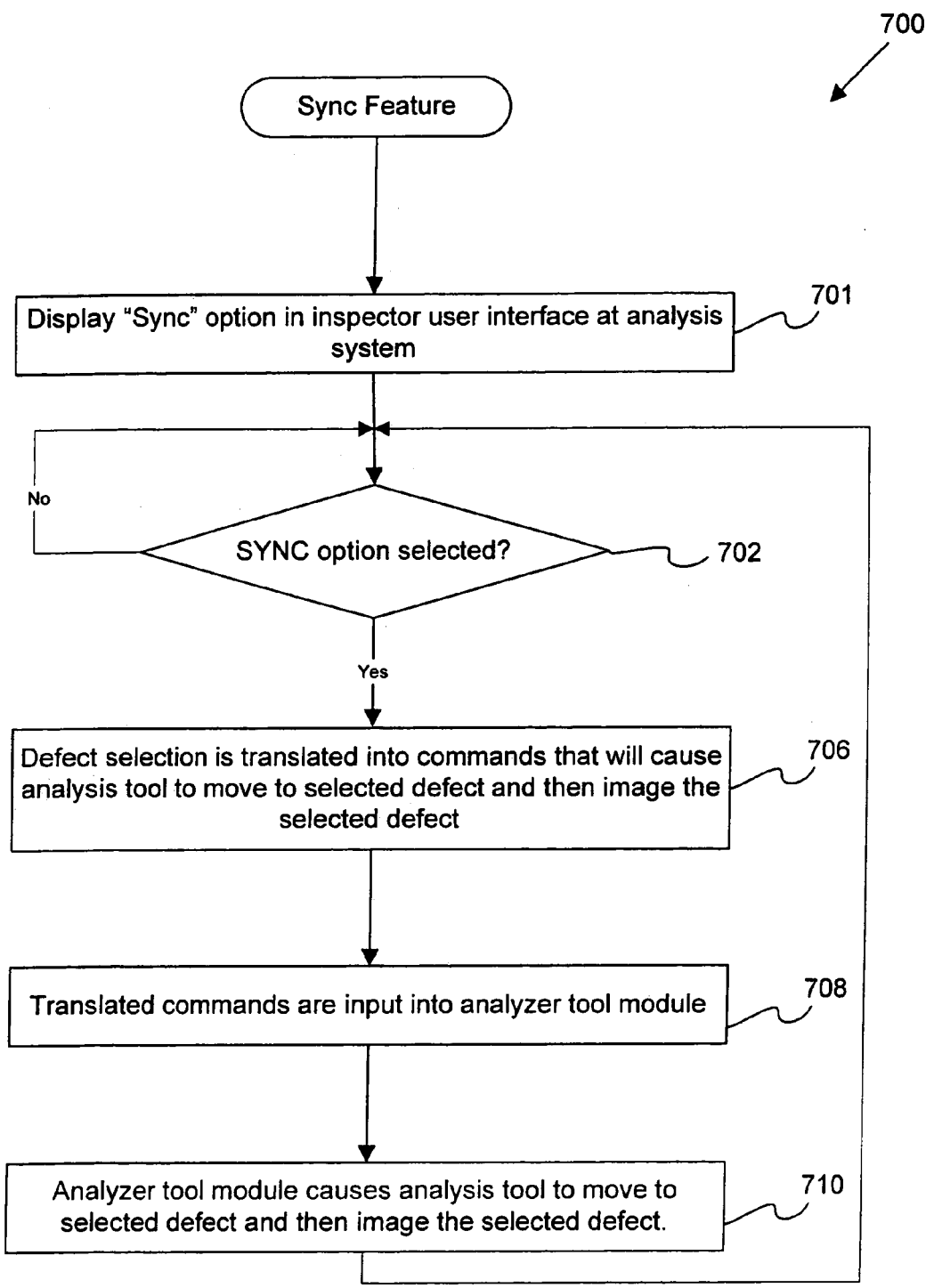
FIG. 7 is a flowchart illustrating a procedure for implementing a "Sync" option in the simulator inspector user interface of the analysis station in accordance with one implementation of the present invention.

As shown in FIG. 3, the inspector user interface may also include a "Sync" option 310 for moving the analysis tool to a particular defect that is selected in the inspector user interface. An operator may be viewing the patches for a selected defect and also wish to review the high resolution image produced by the analyzer tool. FIG. 7 is a flowchart illustrating a procedure 700 for implementing a "Sync" option in the simulator inspector user interface at the analyzer system in accordance with one implementation of the present invention. Initially, a "Sync" option is provided in the inspector user interface of the analysis system in operation 701. For example, the SILC-Inspector 222 of FIG. 2 provides a "Sync" option 310 on the inspector user interface 300 shown in FIG. 3. Of course, any suitable input mechanism (such as checkboxes and pull-down menus) may be utilized for the "Sync" option.

It is then determined whether the provided "Sync" option has been selected in operation 702. The Sync option may be selected in any number of ways and depends on the particular type of interface mechanism. For instance, the Sync option may be selected when an operator hits SYNC button 310 or selects the AUTO sync check box 311 in the illustrated example of FIG. 3. If the AUTO sync check box is selected, the sync option is always selected so that when a user selects a new defect, the analysis tool will automatically go to the selected defect without selection of the Sync button 310. If the Sync option is not selected (via the SYNC button or AUTO check box), the Sync procedure 700 merely waits.

If the Sync option is selected, the current defect selection is translated into commands that will cause the analysis tool to move to selected defect and then image the selected defect in operation 706. In one embodiment, the SILC-Inspector 222 looks at inspector user interface 218 and determines which defect is selected. For example, a defect may be selected via the defect map 316 or the defect table 318 of FIG. 3. A default selection may also be initially used upon loading of the defect results.

The translated commands are then sent to the analysis tool module in operation 708. In one implementation, the SILC-Inspector 222 sends information indicating which defect has been selected to SILC-Analyzer 220. The SILC-Analyzer 220 then translates that information into commands for the analyzer module 204. For example, a mouse selection position that corresponds to a defect on the defect map or defect list on the inspector user interface 218 is translated into absolute coordinate values or defect identity that are input into the analyzer module 204. In one implementation, the SILC-Analyzer translates the defect selection into a series of keyboard or mouse selections that would normally be entered by an operator in the analyzer user interface 210 for specifying where to move the analyzer tool. For instance, the defect selection is translated into mouse movements for selecting a defect via the analyzer user interface 210. After receiving defect selection information, the analyzer module 204 then tells the analysis tool to move its stage to the specified coordinates and image the selected defect in operation 710.

The present invention also allows one to add more information to the inspector native results at the analyzer tool station as the defects are being reviewed. Thus, one can have readily access to more information when analyzing defects at the analyzer tool. More information may aid the process for determining when the inspector tool requires adjustment or when a process has deviated and requires adjusting.

Figure 8:
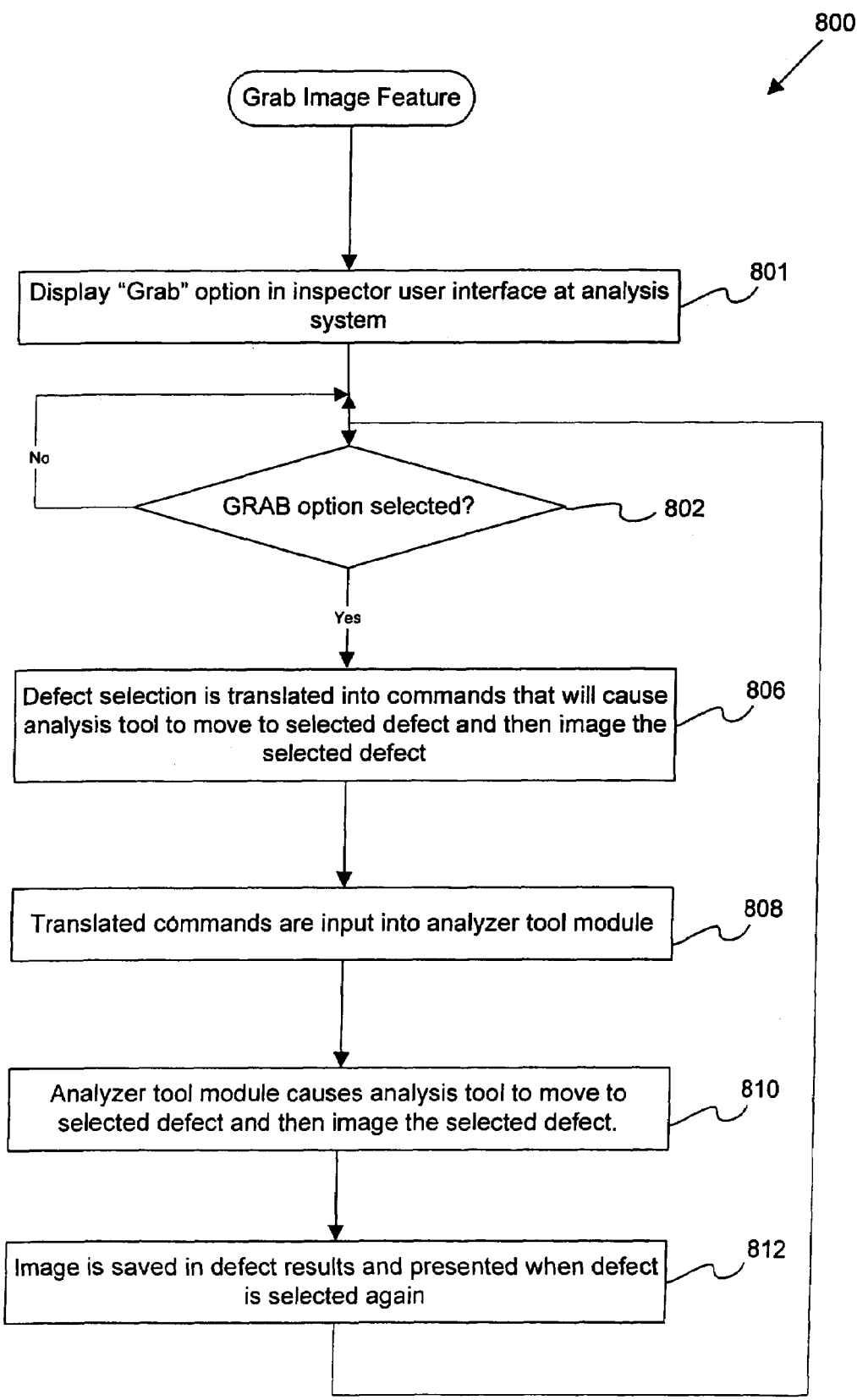
FIG. 8 is a flowchart illustrating a procedure for implementing a "Grab Image" option in the simulator inspector user interface of the analysis station in accordance with one implementation of the present invention.

FIG. 8 is a flowchart illustrating a procedure 800 for implementing a "Grab Image" option in the simulator inspector user interface at the analyzer system in accordance with one implementation of the present invention. Initially, a "Grab Image" option (such as the Grab Image option 304 of FIG. 3) is provided in the inspector user interface of the analysis system in operation 801. Operations 802 through 810 are implemented in a similar manner as the operations 702 through 710 of FIG. 7. That is, when the Grab Image option is selected, the analyzer tool module is instructed to cause the analyzer tool to move to the currently selected defect and image the selected defect. In operation 812, the image is then retained in the defect results to be used whenever the defect is selected again in the future.

In one implementation, when one selects the "grab image" option 306 of FIG. 3, the SILC-Inspector 222 receives this selection and then indicates to the SILC-Analyzer 220 (see FIG. 2) that it needs to grab an image. The SILC-Analyzer then instructs the analyzer tool 202 to grab an image of the currently selected defect. The SILC-Analyzer then copies the grabbed image into a directory that is accessible by the SILC-Inspector. The SILC-Inspector then puts the grabbed image into the native results.

The Grab Image option described above may be implemented on any suitable number of selected defects. In the illustrated embodiment, the "Grab Selected" option 308 allows one to image a plurality of selected defects at a time. Another feature called the "Grab View" check boxes 302 allows one to select one, two, or three different types of images to be generated for a particular defect.

Figure 9:
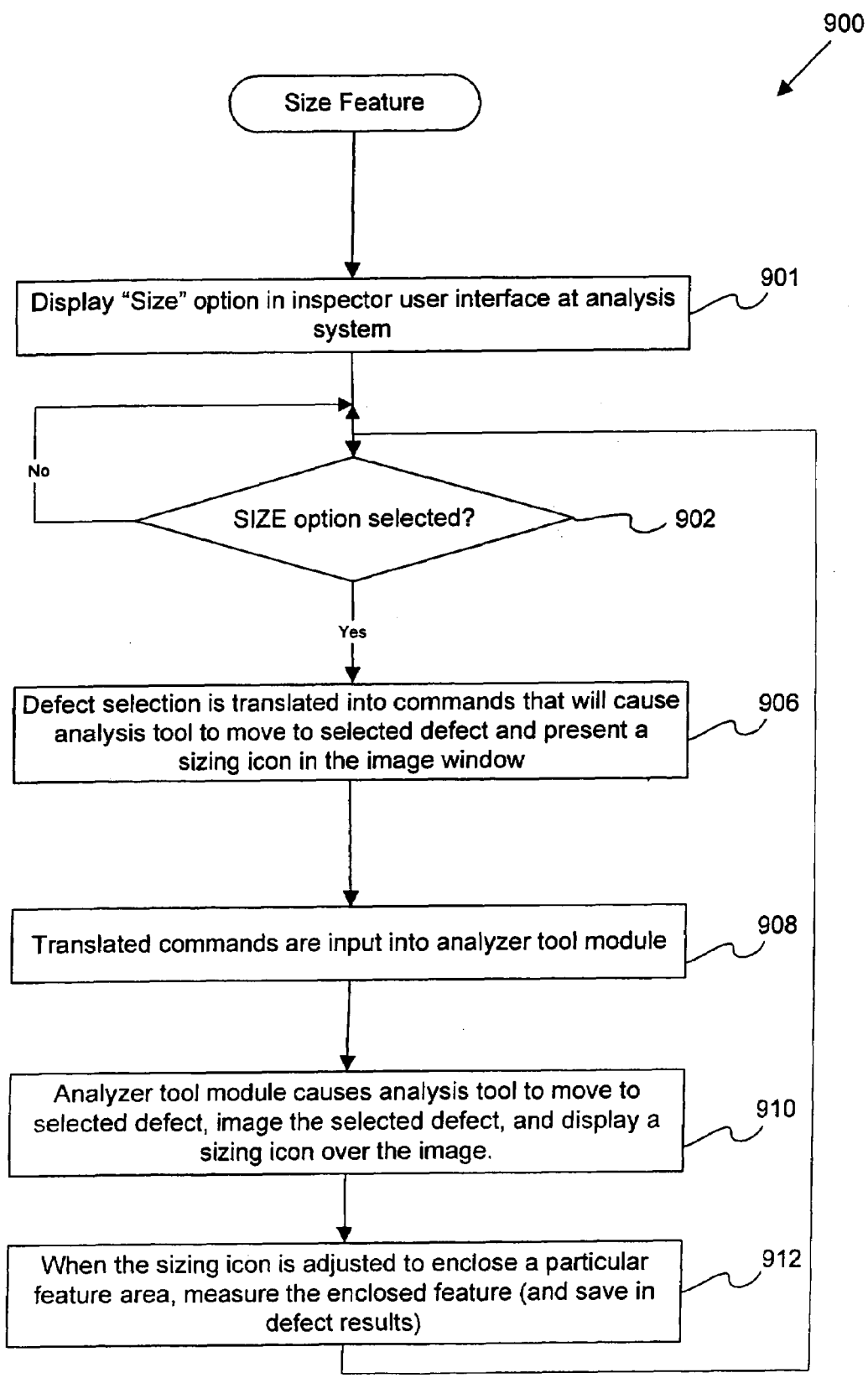
FIG. 9 is a flowchart illustrating a procedure for implementing a "Size" option in the simulator inspector user interface of the analysis station in accordance with one implementation of the present invention.

FIG. 9 is a flowchart illustrating a procedure 900 for implementing a "Size" option in the simulator inspector user interface at the analyzer system in accordance with one implementation of the present invention. A Size option is first presented in the inspector user interface (not shown) in operation 901. When it is determined that the Size option is selected in operation 902, the current defect selection is translated into commands that will cause the analysis tool to move to the selected defect and present a sizing icon in the image window, such as a rubber band type icon, in operation 906.

The translated commands are then input into the analyzer tool module in operation 908 and the analyzer module then causes the analyzer tool to move to the selected defect, image the defect, and present the sizing icon over the defect image in operation 910. For the example of FIG. 2, a rubber band box is displayed in analyzer image area 218. The operator then selects an area to size in analyzer image area 218. That is, the operator selects a "SIZE" button in inspector user interface 212 to initiate the sizing process and may then select a "Done" option in the inspector user interface 212 to indicate when the sizing icon adjustment is complete. Referring back to FIG. 9, when the sizing icon is adjusted to enclose a particular feature area, the enclosed feature is then measured (and the measurement is saved in the defect results) in operation 912.

In one implementation, sizing icon or rubber band manipulations are translated into commands for measuring and entered into the analyzer module 204 via the SILC modules. The SILC-Analyzer module then passes the sizing results to the SILC-Inspector module, which then places this information in the native results, which is then accessible by the inspector module 214 and thereby displayed in the inspector user interface 219. Advantageously, the analyzer module or the SILC-Analyzer module do not have to be know anything about the native results. In this way, the SILC-Inspector module could be used with different analyzer modules or different SILC-Analyzer modules on different analyzer tools, or visa versa.

Figure 10:
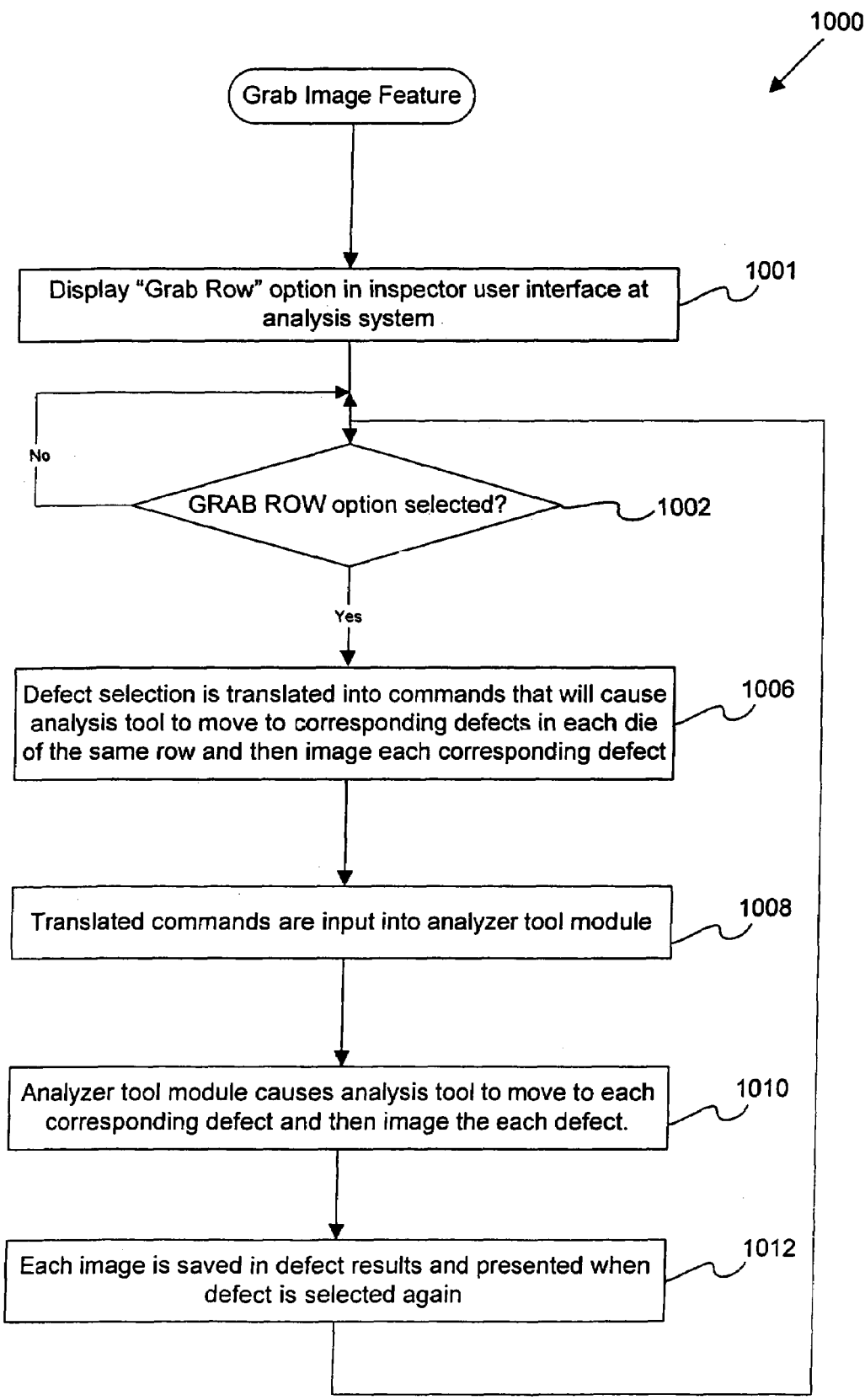
FIG. 10 is a flowchart illustrating a procedure for implementing a "PWQ" (Process Window Qualification) option in the simulator inspector user interface of the analysis station in accordance with one implementation of the present invention.

FIG. 10 is a flowchart illustrating a procedure 1000 for implementing a "PWQ" (Process Window Qualifiation) option in the simulator inspector user interface at the analyzer system in accordance with one implementation of the present invention. Process Window Qualification (PWQ) involves exposing a pattern differently on each die row of a wafer. Such a PWQ option may be presented in the form of a "Grab Row" option (not shown) on the inspector user interface. When this option is selected, each die in an entire row is imaged. For example, the analyzer tool is instructed to step to each die one at a time and grab an image from each die.

In the illustrated procedure of FIG. 10, a "Grab Row" option is provided in the inspector user interface of the analysis system in operation 1001. For example, the SILC-Inspector 222 of FIG. 2 provides a "Grab Row" button (not shown) on the inspector user interface 300 shown in FIG. 3. Of course, any suitable input mechanism (such as check-boxes and pull-down menus) may be utilized for the "Grab Row" option.

It is then determined whether the provided "Grab Row" option has been selected in operation 1002. The Grab Row option may be selected in any number of ways and depends on the particular type of interface mechanism. If the Grab Row option is not selected, the PWQ procedure 1000 merely waits.

If the Grab Row option is selected, the current defect selection is translated into commands that will cause the analysis tool to move to corresponding defects in each die of the same row and then image each corresponding defect in operation 1006. In one embodiment, the SILC-Inspector 222 looks at inspector user interface 218 and determines which defect is selected. For example, a defect may be selected via the defect map 316 or the defect table 318 of FIG. 3. A default selection may also be initially used upon loading of the defect results.

The translated commands are then sent to the analysis tool module in operation 1008. In one implementation, the SILC-Inspector 222 sends information indicating which defects have been selected to SILC-Analyzer 220. The SILC-Analyzer 220 then translates that information into commands for the analyzer module 204. For example, a mouse selection position that corresponds to a defect on the defect map or defect list on the inspector user interface 218 is translated into absolute coordinate values or defect identities for the row of defects that then are input into the analyzer module 204. In one implementation, the SILC-Analyzer translates the defect selection into a series of keyboard or mouse selections that would normally be entered by an operator in the analyzer user interface 210 for specifying which locations to move the analyzer tool. For instance, the defect selection is translated into mouse movements for selecting a defect via the analyzer user interface 210. (After the defect is imaged, this process is repeated for the next defect in the same row.) After receiving defect selection information, the analyzer module 204 then tells the analysis tool to move its stage to the specified coordinates and image the selected defect and this imaging is repeated for each of the corresponding defects in the same row in operation 1010. The image results may also be saved in the defects results for later access in operation 1012.

Figure 11:
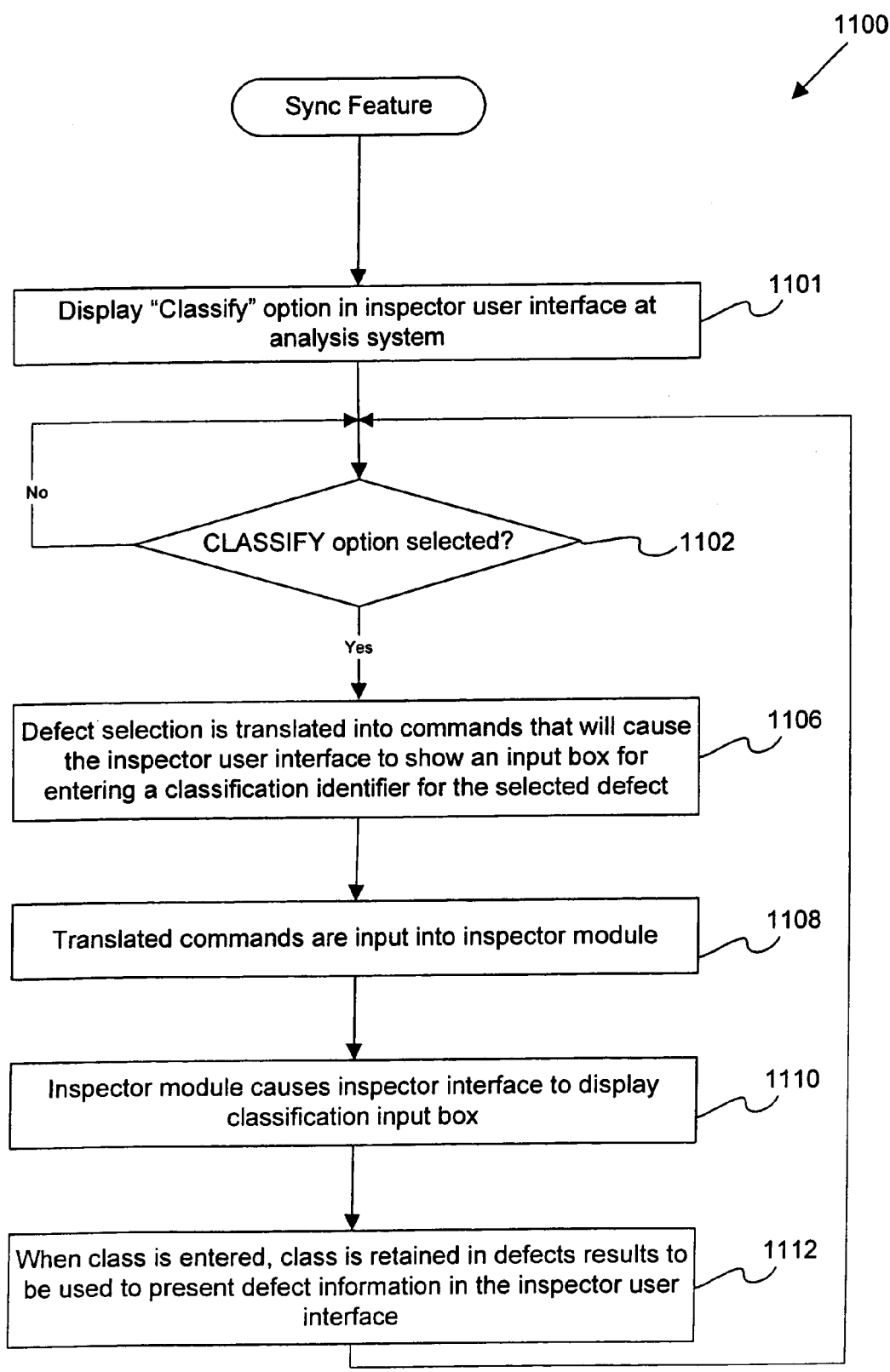
FIG. 11 is a flowchart illustrating a procedure for filtering nuisances from the inspection results in the simulator inspector user interface of the analysis station in accordance with one implementation of the present invention.

FIG. 11 is a flowchart illustrating a procedure 1100 for filtering nuisances from the inspection results in the simulator inspector user interface at the analyzer system in accordance with one implementation of the present invention. An operator or automated process may classify particular defects from the inspection results as nuisances. Nuisances are generally defined as differences in the wafer that are not really defects or are unimportant defects, e.g., which do not affect the integrity of the active device. An operator may view an image of a particular defect using any of the techniques described above or simply by selecting a location on the analyzer tool user interface (e.g., via defect wafer map or defect list).

In the illustrated embodiment, a "Classify" option is presented in the inspector user interface in operation 1101. The process 1100 then waits for a class to be entered in operation 1102. When the "Classify" option is selected, the current defect selection is translated into commands that will cause the inspector user interface to show an input box for entering a classification identifier for the selected defect in operation 1106. The translated commands then cause the inspector user interface to present the input box in operations 1108 and 1110. For example, a classification dialog box is opened in the inspector user interface in which the operator may enter a nuisance class code (or other type of class type).

The operator then classifies the defect. For instance, the operator enters the classification value in the inspector user interface. When the defect is given a class code, the class code is then retained in the defect results to be used in presenting defect information in the inspector user interface in operation 1112. In one implementation, the inspector user interface simulator module reads the new classification value. The class information is then used by the SILC-Inspector to update the native results that is then used by the inspector module to update the defect map, defect list, and optimizer defect graph as described above. The inspector module is also configured to learn to how to classify other defects as nuisances based on the classified nuisance defect. The inspection simulator general determines specific features of the classified nuisance to use in classifying other defects as nuisances when such other defects present the same specific features.

Embodiments of the present invention provide an efficient and elegant solution for adding inspection interface features to the analysis station. The inspection interface simulator is usually developed for debugging inspection software when the inspection software is updated. Thus, the inspection interface simulator is readily available for loading on the analyzer system.

Different inspection modules may be provided to the analyzer system from different tools. When an analyzer tool operator indicates the type of results that are to be analyzed, the analyzer tool automatically knows which type of inspection was executed to obtain the results. This information can be used to determine which one of the inspection interface simulator modules to then load. That is, there may be different simulator modules for different inspection tools.

The present invention provides a simplified, yet powerful, mechanism for importing inspection interfaces onto the analysis tool. Even if a particular function is not implemented in the analyzer tool module, each of the features described herein can still be implemented on the particular analyzer tool. For example, even if an analyzer tool, such as a CD SEM, does not provide a mechanism for reading defect identities (e.g., from a KLARF file) and then moving the SEM automatically to such coordinate, the inspection simulator in conjunction with the SILC-inspector and SILC-analyzer allow selection of a defect and then translating the selected defect into coordinates that are then used to control the SEM. Thus, the inspection simulator advantageously provides a capability to automatically move to a selected defect in a tool that does not normally provide such capability.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. For example, the sample may be any substance or object that is suitable for inspection and review, such as a semiconductor wafer or reticle. By way of alternative examples, the present invention may be especially useful in inspecting thin film heads within hard disks, which are being designed with smaller and smaller dimensions. Accordingly, the present embodiments are to be considered as illustrative and not restrictive, and the invention is not to be limited to the details given herein, but may be modified within the scope and equivalents of the appended claims.

What is claimed is:

1. An apparatus for analyzing defects on a sample, comprising: an analyzer tool arranged for receiving defect results that were generated from an inspection tool, imaging a defect on the sample and generating a high resolution image; at least one display device arranged for presenting the high resolution image generated by the analyzer tool; an analyzer module arranged for managing the analyzer tool and causing the high resolution image generated by the analyzer tool to be presented in the at least one display device; an inspector interface module arranged for simulating an inspector interface in the at least one display device, wherein the inspector interface includes features for receiving and presenting the defect results that were generated from the inspection tool; and a synchronization mechanism that is configured to translate commands that are input into the simulated inspector interface into commands that are input into the analyzer module.

2. An apparatus as recited in claim 1, wherein the defect results include a plurality of defect identifiers, and a plurality of defect locations, a plurality of defect patch images from the corresponding inspection tool, and defect difference intensity values.

3. An apparatus as recited in claim 1, wherein the analyzer tool is in the form of a scanning electron metrology (SEM) review tool.

4. An apparatus as recited in claim 1, wherein the features of the simulated inspector interface are configured to be used to facilitate defect analysis procedures performed at the analyzer tool.

5. An apparatus as recited in claim 1, wherein the features in the inspector interface are configurable to provide useful defect information that is viewable and interactive as one reviews high resolution images produced by the analyzer tool.

6. An apparatus as recited in claim 5, wherein the sample is a wafer and the features in the inspector interface include a defect wafer map showing the positions of the defects found on the wafer by the corresponding inspection tool and a defect list for the defects, their identities, and their position values.

7. An apparatus as recited in claim 6, wherein the features in the inspector interface include a number of image patches that correspond to a currently defect selected from the defect wafer map or the defect list.

8. An apparatus as recited in claim 7, wherein the image patches include a defect patch showing the selected defect and its surrounding area, a corresponding reference patch without the defect, and the selected defect by itself.

9. An apparatus as recited in claim 8, wherein the synchronization module is arranged to cause the analyzer module to control the analysis tool so that it moves to the selected defect and to cause the inspector interface module to display the defect selection in the simulated inspector interface.

10. An apparatus as recited in claim 1, wherein the features of the inspector interface are in the form of selection mechanisms for automatically affecting which images are generated and/or grabbed by the analysis tool.

11. An apparatus as recited in claim 1, wherein the synchronization module comprises an analyzer script module configured for communicating with the analyzer module and an inspector script configured for communicating with the inspector interface module, where the analyzer and inspector scripts are further configured to communicate with each other.

12. An apparatus as recited in claim 4, wherein the features of the inspector interface include a visual optimizer that allows one to repeatedly adjust at least one inspection threshold visually and immediately see the changes to the defect results in the defect wafer map and defect list of the simulated inspector interface so as to optimize the defect results captured by the corresponding inspection tool using such adjusted threshold.

13. An apparatus as recited in claim 12, wherein the features of the inspector interface include features for facilitating defect classification.

14. An apparatus as recited in claim 13, wherein the features of the inspector interface include a sync mechanism for moving the analyzing tool to a particular defect that has been selected in the inspector interface.

15. An apparatus as recited in claim 14, wherein the features include an automatic synchronization mechanism configured to automatically move the analyzing tool to a particular defect that has been selected in the inspector interface.

16. An apparatus as recited in claim 1, wherein the analyzer module is further arranged to display an analyzer interface in the at least one display device, wherein the analyzer interface is configured for allowing a user to control the analysis tool, and wherein the synchronization module is configured to translate user interactions with the inspection interface into user interaction with the analysis interface.

17. An apparatus as recited in claim 16, wherein the features of the inspector interface include a size option that allows a user to select an area of the high resolution image.

18. An apparatus as recited in claim 16, wherein the sample is a wafer and the features of the inspector interface include a process window qualification option that allows a user to select a row or column of dies on the wafer, wherein the synchronization module is arranged to sequentially display high resolution images of each selected die in the display device.

19. An apparatus as recited in claim 13, wherein the features of the inspector interface include a classification input feature that allows a user to classify a defect selected in the inspector interface, wherein the synchronization module is arranged to cause the classification to be stored in the defect results and update defect information that is displayed in the inspector interface.

* * * * *